(12) United States Patent
Sakai (10) Patent No.: US 7,574,552 B2
(45) Date of Patent: Aug. 11, 2009

(54) TARGET DEVICE TO BE CONNECTED TO IEEE 1394 SERIAL BUS

(75) Inventor: Hiroki Sakai, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 61 days.

(21) Appl. No.: 11/505,309

(22) Filed: Aug. 17, 2006

(65) Prior Publication Data

US 2007/0067550 A1 Mar. 22, 2007

(30) Foreign Application Priority Data

Aug. 19, 2005 (JP) ............................. 2005-239026

(51) Int. Cl.
*G06F 13/36* (2006.01)
(52) U.S. Cl. ...................... 710/315; 710/305; 710/306; 711/165
(58) Field of Classification Search ......... 710/305–306, 710/100, 315; 711/165
See application file for complete search history.

(56) References Cited

U.S. PATENT DOCUMENTS 7,076,626 B2 * 7/2006 Saito et al. .................. 711/165

2001/0047475 A1 * 11/2001 Terasaki ..................... 713/160
2004/0264926 A1 * 12/2004 Mizushima et al. ........... 386/69

FOREIGN PATENT DOCUMENTS

| JP | 2001-145054 A | 5/2001 |
| JP | 2001-333130 A | 11/2001 |
| JP | 2004-15181 A | 1/2004 |
| JP | 2004-320609 A | 11/2004 |

* cited by examiner

*Primary Examiner*—Clifford H Knoll
*Assistant Examiner*—Kim T Huynh
(74) *Attorney, Agent, or Firm*—Crowell & Moring LLP (57) ABSTRACT

A target device is provided which is connected to a controller device via IEEE 1394 serial bus, and to an HDD via USB. The target device comprises: an IEEE 1394 interface for sending and receiving a control command, its response signal and stream data to and from the controller device; a USB interface for sending and receiving data to and from the HDD via the USB; a memory for storing control programs to control the target device; and a microprocessor for controlling the operation of the target device based on the control programs stored in the memory and according to a command sent from the controller device. This target device makes it possible to allow an HDD of the type, which is connected to the target device by USB and is thus less expensive than an AVHDD, to serve as a disk subunit on an IEEE 1394 network.

14 Claims, 6 Drawing Sheets

FIG. 6

TARGET DEVICE TO BE CONNECTED TO IEEE 1394 SERIAL BUS

BACKGROUND OF THE INVENTION

1. Field of the Invention

The present invention relates to a target device such as a digital television receiver to be connected to IEEE 1394 serial bus.

2. Description of the Related Art

A hard disk recorder is known which is connected to a controller device such as a set-top box or a digital television receiver using an IEEE 1394 serial bus cable, and which is controlled by an IEEE 1394 control command, called AV/C (Audio and Video Control) command, sent from the controller device. This HDD is an AV (Audio Video) device, and also called AVHDD (Audio Video Hard Disk Drive). The AV/C command is designed to achieve desired functions of AV devices with minimum necessary means in the AV devices so that the necessary means can be mounted even on AV devices having a simple structure. Thus, the AV/C command fits well with AV devices such as HDDs, so that demand for the AVHDD using the AV/C command is expected to increase than before.

However, the AVHDD has the problem that it is more expensive than an HDD of the type which is generally connected to a personal computer by a USB (Universal Serial Bus) cable. This problem can be solved if the HDD of the type which is connected by a general USB cable can function as a disk subunit (hypothetical functional unit having a function as a disk device) on an IEEE 1394 network, which makes it possible to reduce the total cost of the IEEE 1394 network system.

SUMMARY OF THE INVENTION

An object of the present invention is to provide a target device such as a digital television receiver to be connected to IEEE 1394 serial bus that makes it possible to reduce the total cost of an IEEE 1394 network system in a manner that an HDD of the type which is connected by a general USB cable can function as a disk subunit on the IEEE 1394 network.

According to the present invention, this object is achieved by a target device to be connected to IEEE 1394 serial bus, and connected to a controller device via the IEEE 1394 serial bus and to an HDD (Hard Disk Drive) via USB (Universal Serial Bus), the target device comprising: an IEEE 1394 interface for sending and receiving a control command, its response signal and stream data to and from the controller device; a USB interface for sending and receiving data to and from the HDD via the USB; a memory for storing control programs to control the target device; and a microprocessor for controlling operation of the target device based on the control programs stored in the memory and according to a command sent from the controller device, wherein the control programs stored in the memory include a function expansion program containing instructions for various processes to allow the target device to function like a target device with a built-in HDD recorder.

The target device according to the present invention has the USB interface therein and is connected to the HDD via the USB interface. The target device further has the memory therein to store the function expansion program containing instructions for various processes to allow the target device to function like a target device with a built-in HDD recorder. This target device makes it possible to allow an HDD of the type, which is connected to the target device by a USB cable and is thus less expensive than an AVHDD, to serve as a disk subunit on an IEEE 1394 network, so that the total cost of the IEEE 1394 network system can be reduced.

Preferably, the function expansion program contains: instructions for a process such that when the target device receives a SUBUNIT INFO command from the controller device, the target device sends, to the controller device, an AV/C response frame containing a code indicating a disk subunit; and instructions for a process such that when the target device receives, from the controller device, a disk subunit control command, the target device returns, to the controller device, a response the same as a response from the disk subunit.

Further preferably, the function expansion program contains instructions for a process such that if stream data received by the target device from the controller device via the IEEE 1394 interface is stream data for recording which is sent to the disk subunit of the target device, the target device allows the HDD to record the stream data in a file format.

Still further preferably, the function expansion program contains instructions for a process such that the target device allows the HDD to store descriptor information for an IEEE 1394 disk subunit in a file format.

Furthermore, the target device can be a digital television receiver.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. The present invention relates to a target device to be connected to IEEE (Institute of Electrical & Electronics Engineers) 1394 serial bus. The following embodiments describe examples in which the present invention is applied to a digital television receiver as a target device. It is to be understood that the embodiments described herein are not intended as limiting, or encompassing the entire scope of, the invention. Note that like parts are designated by like reference numerals or characters throughout the drawings.

Figure 1:
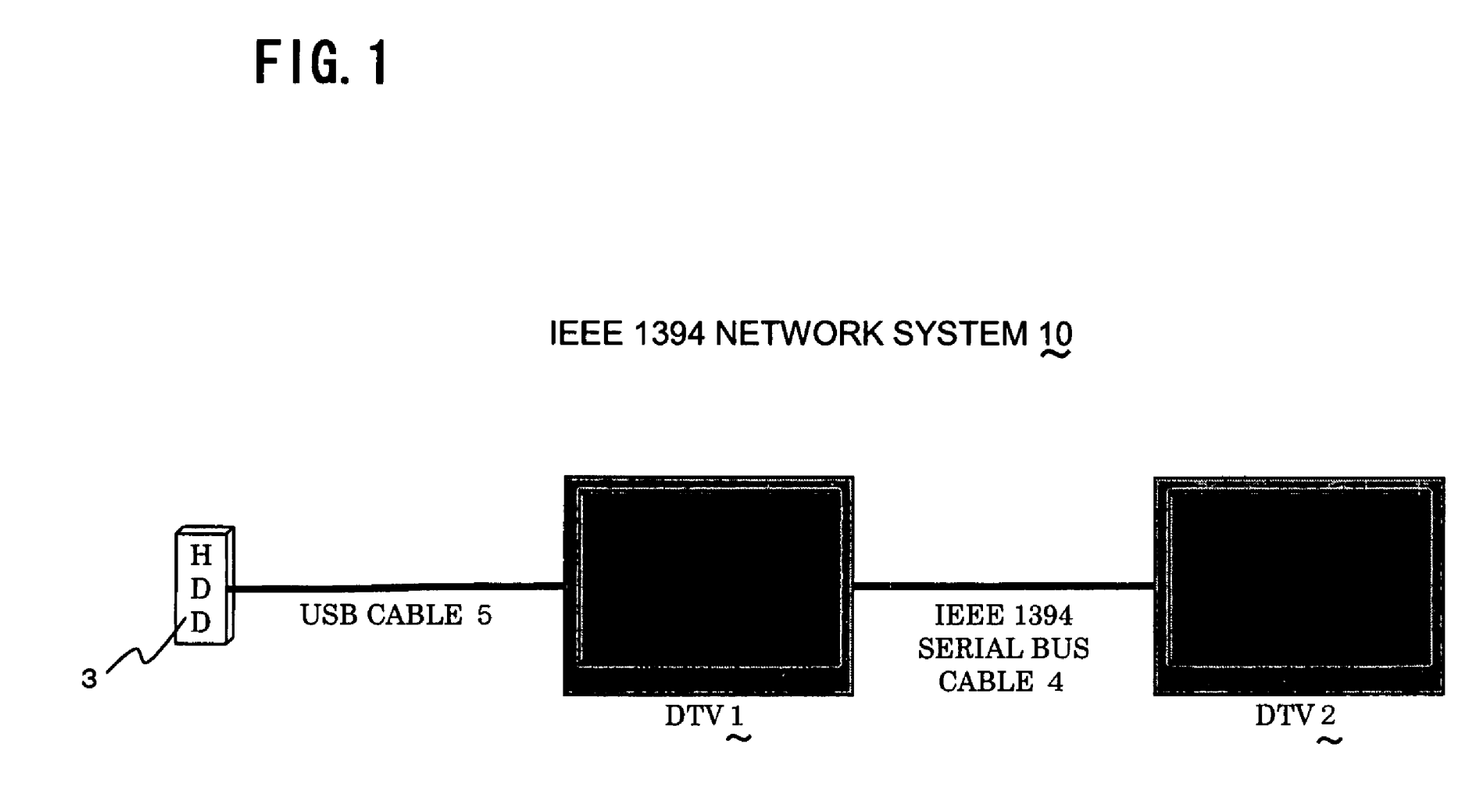
FIG. 1 is a schematic view of an IEEE 1394 network system including a digital television receiver according to an embodiment of the present invention.

FIG. 1 is a schematic view of an IEEE 1394 network system 10 formed by a digital television receiver 1 (claimed "target device" and hereafter referred to simply as DTV) according to an embodiment of the present invention and a DTV 2 (claimed "controller device") connected to the DTV 1 via IEEE 1394 serial bus, more specifically by an IEEE 1394 serial bus cable 4. The DTV 1 is connected to an HDD 3 (Hard Disk Drive) via USB (Universal Serial Bus), more specifically by a USB cable 5. According to the present embodiment, a device (specifically DTV 2) other than the DTV 1 in the IEEE 1394 network system 10 is designed to recognize the HDD 3 as a disk subunit (hypothetical functional unit having a function as a disk device) so as to allow the DTV 1 to function like a DTV with a built-in hard disk recorder (hereafter referred to as HDD recorder or simply as HDD).

Figure 2:
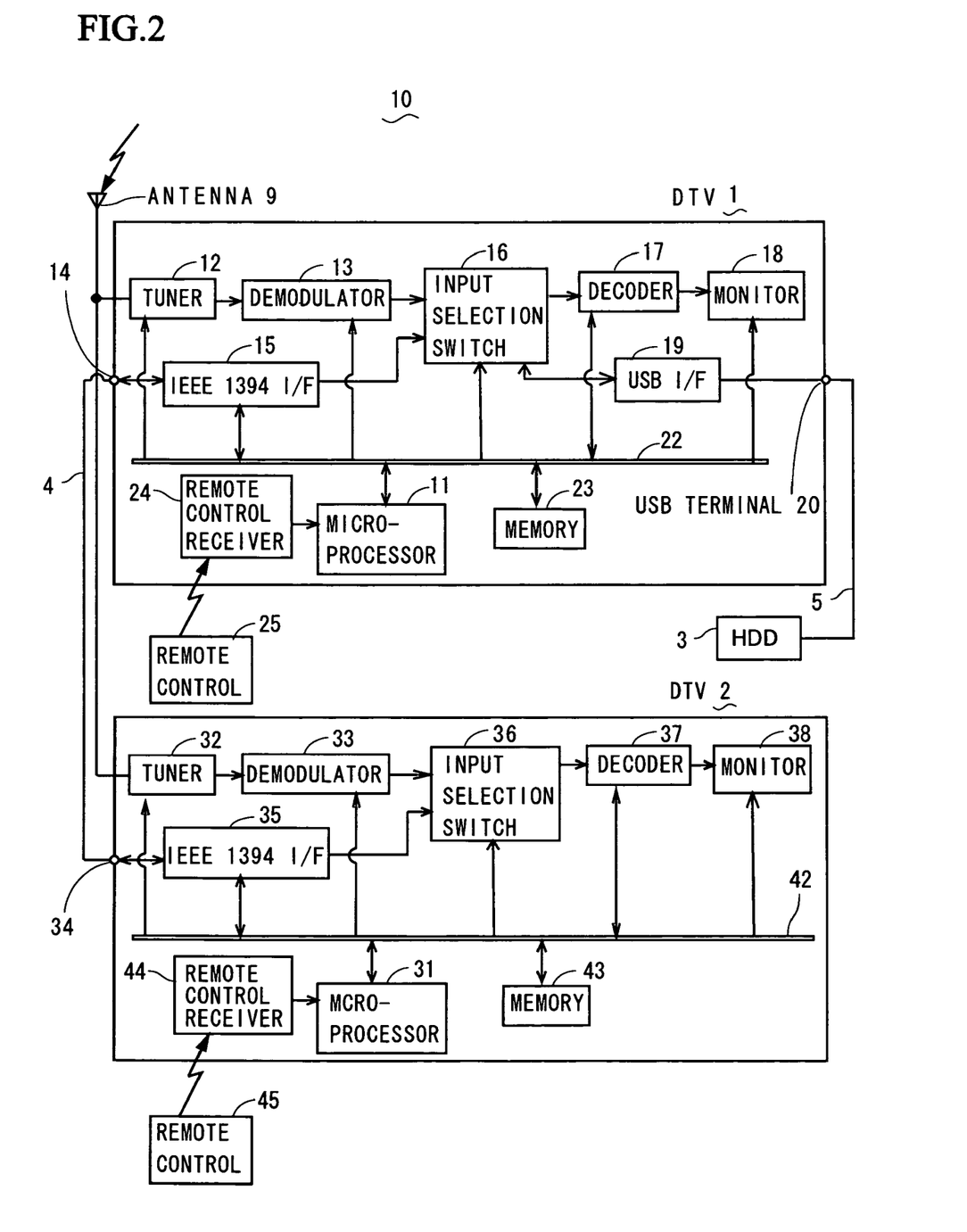
FIG. 2 is a schematic electrical block diagram of the IEEE 1394 network system formed by two digital television receivers.

FIG. 2 is a schematic electrical block diagram of the IEEE 1394 network system 10 formed by the DTV 1 and the DTV 2. The DTV 1 comprises a microprocessor 11 for controlling the entire DTV 1. The microprocessor 11 is connected via internal bus 22 to built-in elements of the DTV 1 which include a tuner 12, a demodulator 13, an input selection switch 16, a decoder 17, a monitor 18, and IEEE 1394 interface 15 (hereafter referred to as IEEE 1394 I/F), a USB interface 19 (hereafter referred to as USB I/F) and a memory 23.

The tuner 12 is a tuner for digital television broadcast, and extracts a broadcast signal of a channel selected by a user from broadcast signals received by an antenna 9. The broadcast signal extracted by the tuner 12 is demodulated by the demodulator 13 according to the broadcast system. The input selection switch 16 switches between: an input line of a broadcast signal in the format of stream data input from the built-in tuner 12 via the demodulator 13; and an input line of stream data input from the DTV 2 via the IEEE 1394 I/F 15. The decoder 17 decodes and separates the broadcast signal demodulated by the demodulator 13 into e.g. a video signal and an audio signal. The video signal decoded by the decoder 17 is output and displayed on the monitor 18.

The IEEE 1394 I/F 15 is an interface circuit for sending and receiving a control command, its response signal and stream data to and from the DTV 2 via an IEEE 1394 bus cable 4 (hereafter referred to as IEEE 1394 cable). The USB I/F 19 is an interface circuit for sending and receiving data to and from the HDD 3 (more specifically a USB interface of the HDD 3) via the USB cable 5. The memory 23 stores various data including various control programs. The DTV 1 also comprises a remote control receiver 24 provided for receiving operation signals from a remote control 25 and connected to the microprocessor 11. The DTV 1 is further provided with a USB terminal 20 for connection to the USB cable 5 and a port 14 for connection to the IEEE 1394 cable 4.

Similarly as in the DTV 1 described above, the DTV 2 comprises a microprocessor 31 which controls the entire DTV 2 and is connected via an internal bus 42 to built-in elements of the DTV 2 including: a tuner 32; a demodulator 33; an input selection switch 36; a decoder 37; a monitor 38; an IEEE 1394 interface 35 (hereafter referred to as IEEE 1394 I/F); a memory 43; a port 34 to be connected to the IEEE 1394 cable 4; and a remote control receiver 44 for receiving operation signals from a remote control 45. The feature of the DTV 2 in contrast to the DTV 1 is that the DTV 2 has no USB I/F, so that it cannot be connected to the HDD 3 via a USB cable.

Figure 3:
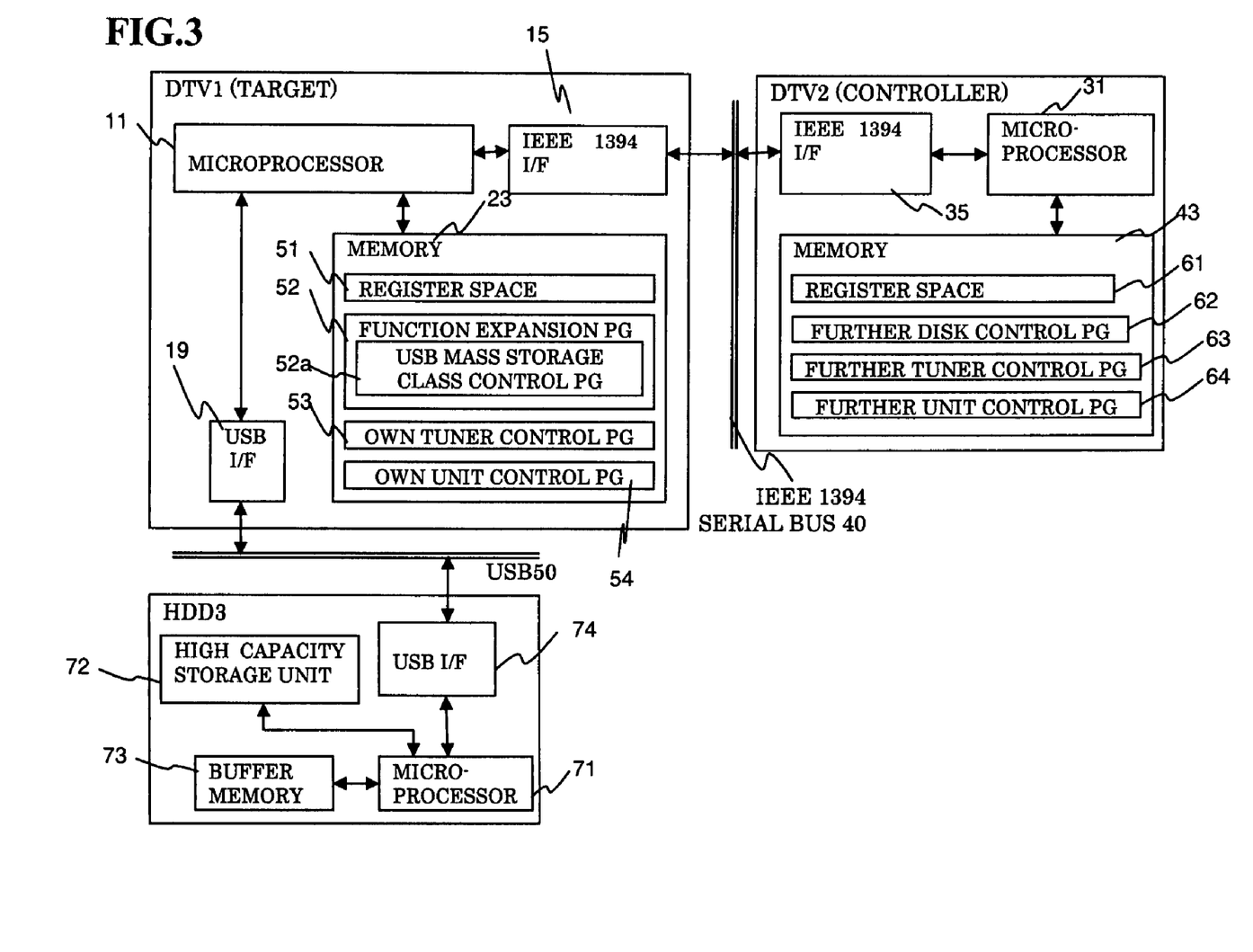
FIG. 3 is a schematic electrical block diagram of a portion of FIG. 2, showing the connections between the two digital television receivers and an HDD, particularly focusing on various control programs which play a central role for sending stream data to the HDD.

FIG. 3 is a schematic electrical block diagram of a portion of FIG. 2, showing the connections between the DTV 2, the DTV 1 and the HDD 3, particularly focusing on various control programs which play a central role for sending stream data to the HDD 3 connected to the DTV 1. Referring to FIG. 3, the following describes the operation of the various control programs. In the following description, it is assumed that the DTV 2 is a controller device (more specifically a connected device serving as a controller), and the DTV 1 is a target device (more specifically a connected device serving as a target).

As shown, the memory 23 of the DTV 1 stores data including: a register space 51 formed e.g. of a CSR (Control and Status Register) architecture and a configuration ROM (Read Only Memory) storing device-specific information of the DTV 1; and various control programs for controlling the operation of the DTV 1 as a target device, in which the control programs include a function expansion program (PG) 52, an own tuner control program (PG) 53 and an own unit control program (PG) 54. The function expansion program 52 is a program containing instructions for various processes to allow the DTV 1 to function like a DTV with a built-in HDD recorder. This function expansion program 52 contains a USB mass storage class control program (PG) 52a which is a program for controlling the HDD 3 via the USB 50. The own tuner control program 53 is a program for controlling the tuner 12 of the DTV 1 according to an AV/C (Audio and Video Control) command provided for controlling a tuner subunit and sent from the DTV 2 via the IEEE 1394 serial bus 40. Furthermore, the own unit control program 54 is a program for controlling the state of power supply of the DTV 1 according to an AV/C command sent from the DTV 2, and for processing e.g. a response to an inquiry command sent from the DTV 2 via the IEEE 1394 serial bus 40.

The function expansion program 52 contains instructions for various processes. These processes include: (1) a process to allow the HDD 3 to store descriptor information for an IEEE 1394 disk subunit in a file format; (2) a process that when receiving a SUBUNIT INFO (Subunit Information) command from the DTV 2, the microprocessor 11 of the DTV 1 sends, to the DTV 2, an AV/C response frame containing a code indicating a disk subunit; (3) a process that when receiving a disk subunit control command from the DTV 2, the microprocessor 11 of the DTV 1 returns, to the DTV 2, a response which is the same as a response from the disk subunit, and further controls, if necessary, the HDD 3 via the USB I/F 19 and the USB 50; and (4) a process that if stream data received from the DTV 2 via the IEEE 1394 I/F 15 is stream data for recording which is sent to the disk subunit of the DTV 1 itself, the microprocessor 11 of the DTV 1 allows the HDD 3 to record the stream data in a file format.

As shown in FIG. 3, the memory 43 of the DTV 2 stores data including: a register space 61 formed e.g. of a CSR architecture and a configuration ROM storing device-specific information of the DTV 2; and various control programs for controlling the operation of the DTV 2 as a controller for the DTV 1, in which the control programs include a further-device disk control program (further disk control PG) 62, a further-device tuner control program (further tuner control PG) 63 and a further-device unit control program (further unit control PG) 64. These further-device disk control program 62, further-device tuner control program 63 and further-device unit control program 64 are programs of the controller device which respectively correspond to the function expansion program 52, own tuner control program 53 and own unit control program 54 of the DTV 1 as the target device.

Note that although not shown, the memory 43 of the DTV 2 also stores control programs similar to the own tuner control program 53 and own unit control program 54 of the DTV 1 in order to control the operation of the DTV 2 when serving as a target device. Similarly, the memory 23 of the DTV 1 also stores control programs similar to the further-device tuner control program 63 and further-device unit control program 64 of the DTV 2 in order to control the operation of the DTV 1 when serving as a controller device. Besides, the HDD 3 comprises a microprocessor 71 for controlling the entire HDD 3 as well as a USB interface 74 for receiving control commands from, and sending and receiving data to and from, the DTV 1 via the USB 50. The HDD 3 further comprises a high capacity storage unit 72 formed of magnetic heads and hard disks as recording media as well as a buffer memory 73 for temporarily storing read data and data to be recorded.

Figure 4:
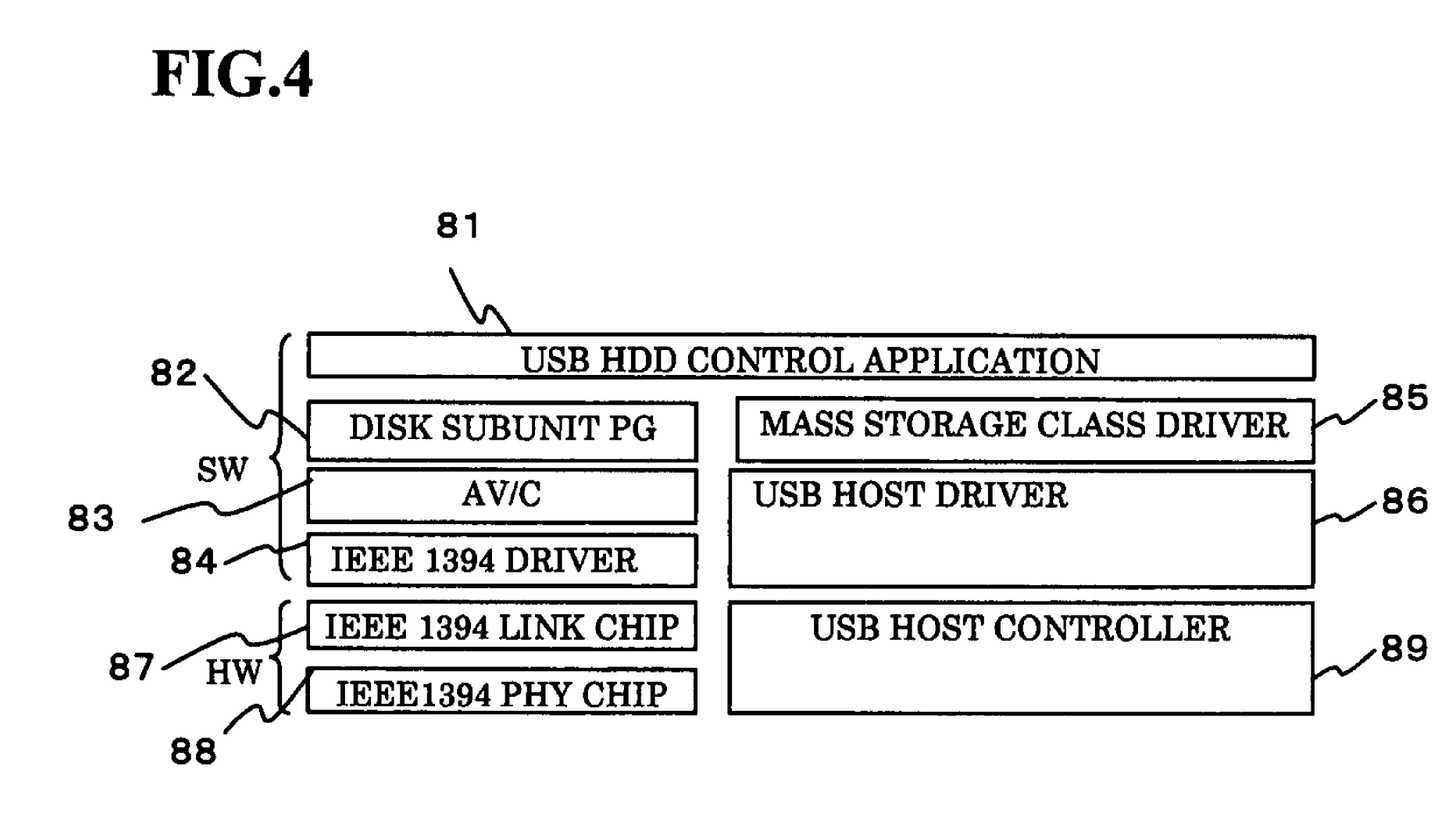
FIG. 4 is a schematic chart showing an example of a stack architecture embodying a USB mass storage class control program for controlling the HDD via USB shown in FIG. 3.

FIG. 4 is a schematic chart showing an example of a stack architecture embodying the USB mass storage class control program 52a (program for controlling the HDD 3 via the USB 50) shown in FIG. 3 above. The USB mass storage class control program 52a can be embodied e.g. by various software (SW) comprising a USB HDD (USB-connected) control application 81, a disk subunit program (PG) 82, an AV/C program (PG) 83, an IEEE 1394 driver 84, a mass storage class driver 85 and a USB host driver 86. The disk subunit program 82 is a program for achieving the function as a disk subunit. The AV/C program 83 is a program for achieving the AV/C standard. The mass storage class driver 85 is a program provided in the host for controlling the HDD 3.

Note that those programs located in higher positions in FIG. 4 are located higher in the OSI hierarchy where OSI stands for ISO (International Organization for Standardization) Open Systems Interconnection. Besides, in order to achieve control using the USB mass storage class control program 52a, it is also necessary to use hardware (HW) including an IEEE 1394 LINK (Link Layer) chip 87, an IEEE 1394 PHY (Physical Layer) chip 88 and a USB host controller 89.

Figure 5:
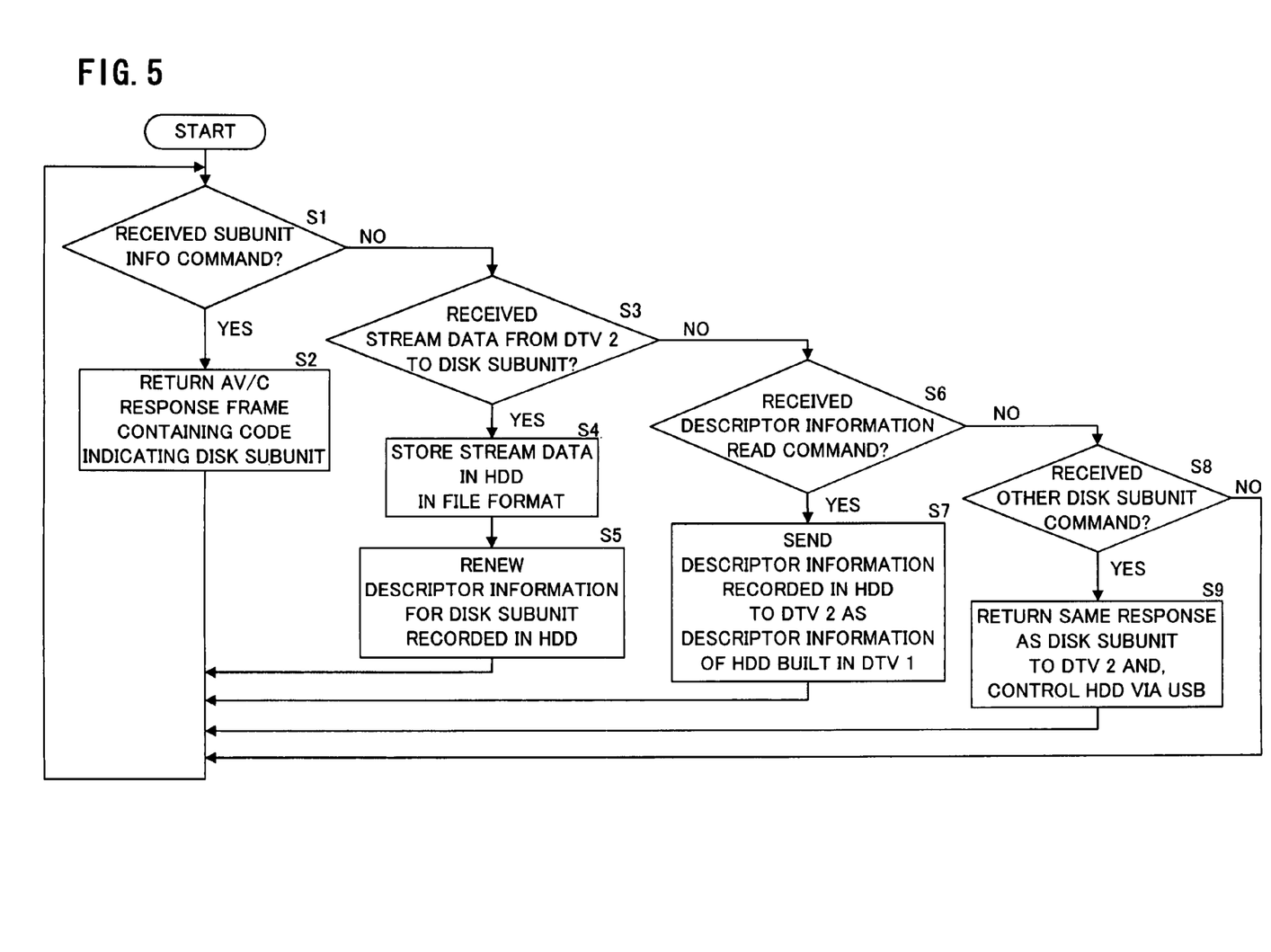
FIG. 5 is a flow chart showing a process performed by a function expansion program of the digital television receiver shown in FIG. 2.
Figure 6:
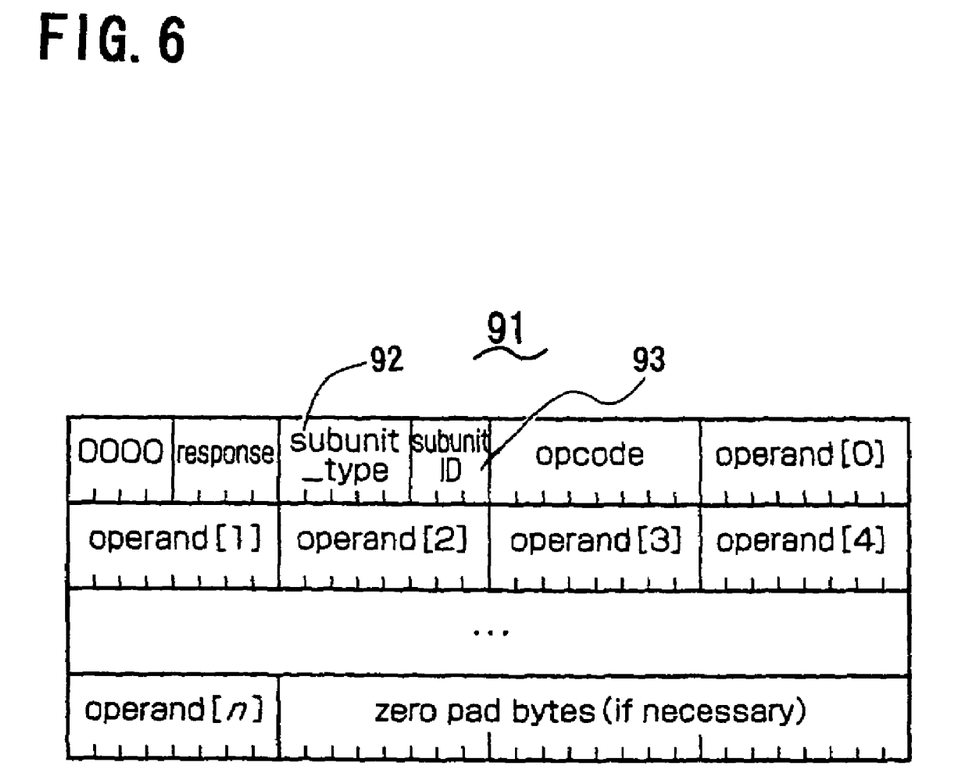
FIG. 6 is a schematic chart showing a format of an AV/C response frame.

FIG. 5 is a flow chart showing a process performed by the function expansion program 52 of the DTV 1. When the microprocessor 11 of the DTV 1 detects that the DTV 1 (USB I/F 19) is connected to the HDD 3 via the USB 50 (using the USB cable 5), the microprocessor 11 creates descriptor information for an IEEE 1394 disk subunit based on the capacity of the hard disks of the HDD 3 and the information of content stored in the HDD 3, and stores this descriptor information in the HDD 3 in a file format. When the DTV 1 receives a SUBUNIT INFO command from the DTV 2 (YES in S1), the microprocessor 11 of the DTV 1 sends or returns, to the DTV 2, an AV/C response frame containing a code indicating a disk subunit (S2). Describing this step S2 more specifically with reference to FIG. 6, which is a schematic chart showing a format of an AV/C response frame 91, the microprocessor 11 of the DTV 1 enters, into a subunit-type 92 of the AV/C response frame 91, a code indicating that the DTV 1 itself has a tuner subunit, a motor subunit and a disk subunit, and sends the AV/C response frame 91 with this code to the DTV 2.

If NO in step S1 and if the stream data received from the DTV 2 via the IEEE 1394 I/F 15 is stream data for recording which is sent to the disk subunit of the DTV 1 itself (YES in S3), the microprocessor 11 of the DTV 1 allows the HDD 3 to record this stream data in a file format via the USB 50 (S4), and renews the descriptor information for the IEEE 1394 disk subunit which is recorded in the HDD 3 (S5).

If NO in step S3 and when receiving, from the DTV 2, a read command to read descriptor information of the disk subunit (S6), the microprocessor 11 of the DTV 1 reads the descriptor information of the disk subunit recorded in the HDD 3 via the USB 50, and sends, to the DTV 2, this read descriptor information as descriptor information of a built-in HDD in the DTV 1 (S7).

If NO in step S6 and when receiving, from the DTV 2, a disk subunit control command other than the read command (YES in S8), the microprocessor 11 of the DTV 1 returns, to the DTV 2, a response the same as the response from the disk subunit, and further controls, if necessary, the HDD 3 via the USB I/F 19 and the USB 50 (S9).

As described in the foregoing, the DTV 1 according to the present embodiment has a USB I/F 19 therein and is connected to the HDD 3 via the USB I/F 19. The DTV 1 further has a memory 23 therein to store a function expansion program 52 containing instructions for various processes to allow the DTV 1 to function like a DTV with a built-in HDD recorder (hard disk recorder). This makes it possible to allow the HDD 3 of the type, which is connected by a USB cable 5 and is thus less expensive than an AVHDD, to serve as a disk subunit on an IEEE 1394 network, so that the total cost of the IEEE 1394 network system can be reduced.

It is to be noted that the present invention is not limited to the above-described embodiments, and various modifications are possible. For example, the above embodiment shows the case in which a DTV, as a target device, is connected to a single HDD using a USB cable. However, it is also possible to connect the DTV to multiple HDDs using USB cables. Furthermore, the above embodiment shows the case in which the target device connected to the HDD using a USB cable is a DTV. However, the target device connected to the HDD is not limited to a DTV, and can be, for example, a set-top box for receiving a digital television broadcast signal or a DVD (Digital Versatile Disc) recorder. In addition, although the above embodiment shows the case in which the controller device is a DTV, the controller device is not limited thereto, and can also be a set-top box for receiving a digital television broadcast signal.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2005-239026 filed Aug. 19, 2005, the content of which is hereby incorporated by reference.

What is claimed is:

1. A target device to be connected to IEEE 1394 serial bus, connected to a controller device via the IEEE 1394 serial bus, and connected to an external HDD (Hard Disk Drive) via USB (Universal Serial Bus), the target device comprising:

an IEEE 1394 interface for sending and receiving a control command, its response signal and stream data to and from the controller device;

a USB interface for sending and receiving data to and from the HDD via the USB, wherein the target device is directly connected to the external HDD via only the USB;

a memory for storing control programs to control the target device; and a microprocessor for controlling operation of the target device based on the control programs stored in the memory and according to a command sent from the controller device, wherein the control programs stored in the memory include a function expansion program containing instructions for various processes to allow the target device to function like a target device with a built-in HDD recorder even though the HDD is external to the target device, wherein the target and controller devices are digital television receivers and each include a tuner.

2. The target device according to claim 1, wherein the function expansion program contains:
instructions for a process such that when the target device receives a SUBUNIT INFO command from the controller device, the target device sends an AV/C response frame containing a code indicating a disk subunit to the controller device; and
instructions for a process such that when the target device receives a disk subunit control command from the controller device, the target device returns a response the same as a response from the disk subunit to the controller device.

3. The target device according to claim 2,
wherein the function expansion program contains instructions for a process such that if stream data received by the target device from the controller device via the IEEE 1394 interface is stream data for recording which is sent to the disk subunit of the target device, the target device allows the HDD to record the stream data in a file format.

4. The target device according to claim 3,
wherein the function expansion program contains instructions for a process such that when the microprocessor detects that the target device is connected to the HDD via the USB, the microprocessor creates descriptor information for an IEEE 1394 disk subunit based on capacity of hard disks of the HDD and information of content stored in the HDD, and stores this descriptor information in the HDD in a file format.

5. The target device according to claim 2,
wherein the function expansion program contains instructions for a process such that when the microprocessor detects that the target device is connected to the HDD via the USB, the microprocessor creates descriptor information for an IEEE 1394 disk subunit based on capacity of hard disks of the HDD and information of content stored in the HDD, and stores this descriptor information in the HDD in a file format.

6. A system comprising:
a controller digital television receiver that includes
an IEEE 1394 interface for sending and receiving a control command; and
a tuner;
a target digital television receiver that includes
a tuner;
an IEEE 1394 interface that sends and receives a control command, its response signal and stream data to and from the controller digital television receiver;
a USB interface that sends and receives data to and from an external hard disk drive (HDD) via only the USB, wherein the external HDD is directly connected to the target digital television receiver;
a memory that stores control programs to control the target digital television receiver; and
a microprocessor that controls operation of the target digital television receiver based on the control programs stored in the memory and according to a command sent from the controller digital television receiver,
wherein the control programs stored in the memory include a function expansion program containing instructions for various processes to allow the target digital television receiver to function like a target device with a built-in HDD recorder even though the HDD is external to the target digital television receiver.

7. The system according to claim 6, wherein the function expansion program contains:
instructions for a process such that when the target digital television receiver receives a SUBUNIT INFO command from the controller digital television receiver, the target digital television receiver sends an AV/C response frame containing a code indicating a disk subunit to the controller digital television receiver; and
instructions for a process such that when the target digital television receiver receives a disk subunit control command from the controller digital television receiver, the target digital television receiver returns a response the same as a response from the disk subunit to the digital television receiver device.

8. The system according to claim 7, wherein the function expansion program contains instructions for a process such that if stream data received by the target digital television receiver from the controller digital television receiver via the IEEE 1394 interface is stream data for recording which is sent to the disk subunit of the target digital television receiver, the target digital television receiver allows the HDD to record the stream data in a file format.

9. The system according to claim 8, wherein the function expansion program contains instructions for a process such that when the microprocessor detects that the target digital television receiver is connected to the HDD via the USB, the microprocessor creates descriptor information for an IEEE 1394 disk subunit based on capacity of hard disks of the HDD and information of content stored in the HDD, and stores this descriptor information in the HDD in a file format.

10. The system according to claim 7, wherein the function expansion program contains instructions for a process such that when the microprocessor detects that the target digital television receiver is connected to the HDD via the USB, the microprocessor creates descriptor information for an IEEE 1394 disk subunit based on capacity of hard disks of the HDD and information of content stored in the HDD, and stores this descriptor information in the HDD in a file format.

11. The target device according to claim 1, wherein the target device includes a monitor.

12. The target device of claim 11, wherein the controller device includes a monitor.

13. The system of claim 6, wherein the target digital television receiver includes a monitor.

14. The system of claim 13, wherein the controller digital television receiver includes a monitor.

* * * * *